US011201635B2

(12) United States Patent
Chu et al.

(10) Patent No.: US 11,201,635 B2
(45) Date of Patent: Dec. 14, 2021

(54) ELECTRONIC DEVICE INCLUDING FOLDABLE HOUSING

(71) Applicant: Samsung Electronics Co., Ltd., Suwon-si (KR)

(72) Inventors: Duho Chu, Suwon-si (KR); Yongyoun Kim, Suwon-si (KR); Jaesung Shim, Suwon-si (KR); Myeongsu Oh, Suwon-si (KR); Hojin Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 16/669,164

(22) Filed: Oct. 30, 2019

(65) Prior Publication Data

US 2020/0136668 A1 Apr. 30, 2020

(30) Foreign Application Priority Data

Oct. 31, 2018 (KR) ........................ 10-2018-0132604

(51) Int. Cl.
*H04B 1/3827* (2015.01)
*H01Q 1/24* (2006.01)
(Continued)

(52) U.S. Cl.
CPC ......... *H04B 1/3838* (2013.01); *G06F 1/1616* (2013.01); *G06F 1/1641* (2013.01);
(Continued)

(58) Field of Classification Search
CPC . H04B 1/3838; H04B 17/102; H04W 52/367; H01Q 1/243; H01Q 1/245;
(Continued)

(56) References Cited

U.S. PATENT DOCUMENTS 9,189,127 B2 11/2015 Lee et al.
10,244,488 B2 3/2019 Lee et al.
(Continued)

FOREIGN PATENT DOCUMENTS

KR 10-2013-0068250 A 6/2013
WO 2016048554 A1 3/2016

OTHER PUBLICATIONS

Partial European Search Report dated Sep. 18, 2020 in connection with European Application No. 19205700.8, 16 pages.

*Primary Examiner* — Yuwen Pan
*Assistant Examiner* — Fatuma G Sherif

(57) ABSTRACT

An electronic device includes a foldable housing including a hinge structure, a first housing structure including a first surface facing a first direction and a second surface facing a second direction opposite to the first direction, a second housing structure including a third surface facing a third direction and a fourth surface facing a fourth direction opposite to the third direction, and folded with respect to the first housing structure about the hinge structure, a wireless communication circuitry disposed inside the first housing structure or the second housing structure, a sensor disposed inside the first housing structure or the second housing structure, a grip sensor circuitry disposed outside the first housing structure or the second housing structure, a processor disposed inside the first housing structure or the second housing structure, and a memory operatively connected with the processor.

17 Claims, 6 Drawing Sheets

(51) Int. Cl.
*H04M 1/02* (2006.01)
*G06F 1/16* (2006.01)

(52) U.S. Cl.
CPC .......... *H01Q 1/245* (2013.01); *H04M 1/0222* (2013.01); *H04M 1/0247* (2013.01); *H04M 2250/22* (2013.01)

(58) Field of Classification Search
CPC .... G06F 1/1656; G06F 1/1616; G06F 1/1641; G06F 1/1698; G06F 1/1652; H04M 1/0216; H04M 1/0222; H04M 1/0247; H04M 2250/22; H04M 1/0214; H04M 1/0268
See application file for complete search history.

(56) References Cited

U.S. PATENT DOCUMENTS

| | | | |
|---|---|---|---|
| 2013/0159931 A1 | 6/2013 | Lee et al. | |
| 2016/0149597 A1* | 5/2016 | Takasu | G06F 1/1698 455/127.2 |
| 2017/0164300 A1* | 6/2017 | Lee | H04B 1/3838 |
| 2017/0192478 A1* | 7/2017 | Mercer | H04B 1/3838 |
| 2019/0064950 A1* | 2/2019 | Hsu | G01R 27/2605 |

\* cited by examiner

ELECTRONIC DEVICE INCLUDING FOLDABLE HOUSING

CROSS-REFERENCE TO RELATED APPLICATIONS

This application is based on and claims priority under 35 U.S.C. § 119 to Korean Patent Application No. 10-2018-0132604, filed on Oct. 31, 2018, in the Korean Intellectual Property Office, the disclosure of which is incorporated by reference herein its entirety.

BACKGROUND

1. Field

The disclosure relates to an electronic device including a foldable housing.

2. Description of Related Art

A specific absorption rate (SAR) is a numerical value of an amount of electromagnetic waves absorbed by a human body.

To reduce the numerical value of the SAR, the intensity of an electromagnetic wave signal actually radiated from an antenna may be reduced by changing an antenna radiation pattern or reducing power supplied to the antenna.

An antenna shape or a matching value is changed for the changing of the antenna radiation pattern, which exerts an influence on the whole performance of the antenna. In addition, in an electronic device using a metal frame as an antenna, the antenna radiation pattern may not be easily changed.

Further, transmission power may be lowered to satisfy the SAR standard, which causes the whole antenna performance of a phone to be deteriorated.

The above information is presented as background information only to assist with an understanding of the disclosure. No determination has been made, and no assertion is made, as to whether any of the above might be applicable as prior art with regard to the disclosure.

SUMMARY

When the foldable electronic device is folded, the capacitance measured by a grip sensor is increased as a metal part of a counterpart approaches. When the capacitance exceeds a threshold value, the electronic device may reduce power supplied to the antenna radiator, which causes performance to be deteriorated.

In addition, the foldable electronic device has radiation performance different in the folding state and the unfolded state, which makes difference is made in the SAR value. Therefore, the antenna radiator may be set to be supplied with power different depending on folding states.

Aspects of the disclosure are to address at least the above-mentioned problems and/or disadvantages and to provide at least the advantages described below. Accordingly, an aspect of the disclosure is to sense a folding state of an electronic device using a sensor and to control an antenna depending on the folding state.

In accordance with another aspect of the disclosure, an electronic device may include a foldable housing including a hinge structure, a first housing structure coupled to the hinge structure and including a first surface facing a first direction and a second surface facing a second direction opposite to the first direction, a second housing structure coupled to the hinge structure, including a third surface facing a third direction and a fourth surface facing a fourth direction opposite to the third direction, and folded with respect to the first housing structure about the hinge structure, wherein the first surface faces the third surface when the foldable housing is folded, and the first direction is the same as the third direction when the foldable housing is unfolded, a wireless communication circuitry disposed inside the first housing structure or the second housing structure, an antenna radiator disposed inside the first housing structure or the second housing structure or exposed through at least one surface of the first housing structure or the second housing structure and electrically connected with the wireless communication circuitry, a sensor disposed inside the first housing structure or the second housing structure to sense a folding state of the foldable housing, a grip sensor circuitry disposed inside the first housing structure or the second housing structure or exposed through at least one surface of the first housing structure or the second housing structure, a processor disposed inside the first housing structure or the second housing structure and operatively connected with the wireless communication circuitry, the sensor, and the grip sensor circuitry, and a memory operatively connected with the processor. The memory may store instructions that when executed, cause the processor to sense the folding state of the foldable housing by using the sensor, calculate a reference capacitance for measuring a variation in a capacitance measured through the grip sensor circuitry, when the folding state of the foldable housing is changed, and control the wireless communication circuitry to restrict an intensity of a signal radiated from the antenna radiator to be equal to or less than a value resulting from the folding state of the foldable housing, when the variation in the capacitance measured through the grip sensor circuitry exceeds a preset threshold value.

In accordance with another aspect of the disclosure, an electronic device may include a foldable housing including, a hinge structure, a first housing structure coupled to the hinge structure and including a first surface facing a first direction and a second surface facing a second direction opposite to the first direction, a second housing structure coupled to the hinge structure, including a third surface facing a third direction and a fourth surface facing a fourth direction opposite to the third direction, and folded with respect to the first housing structure about the hinge structure, wherein the first surface faces the third surface when the foldable housing is folded, and the first direction is the same as the third direction when the foldable housing is unfolded, a wireless communication circuitry disposed inside the first housing structure or the second housing structure, a sensor disposed inside the first housing structure or the second housing structure to sense a folding state of the foldable housing, a grip sensor circuitry disposed outside the first housing structure or the second housing structure, a processor disposed inside the first housing structure or the second housing structure and operatively connected with the wireless communication circuitry, the sensor, and the grip sensor circuitry, and a memory operatively connected with the processor. The memory may store instructions that when executed, cause the processor to control the grip sensor circuit, based at least on sensor data obtained from the sensor.

In accordance with another aspect of the disclosure, in a computer-readable storage medium to store instructions, the instructions may cause, when executed by a processor of an electronic device including a foldable housing, the electronic device to sense a folding state of the foldable housing, to calculate a reference capacitance for measuring a variation in a capacitance measured through a grip sensor circuitry, when the folding state of the foldable housing is changed, and to restrict an intensity of a signal radiated from an antenna radiator to be equal to or less than a value resulting from the folding state of the foldable housing when the variation in the capacitance measured through the grip sensor circuitry exceeds a preset threshold value.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

In the following description made with respect to the accompanying drawings, similar components will be assigned with similar reference numerals.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device Hereinafter, various embodiments of the disclosure may be described with reference to accompanying drawings. However, those of ordinary skill in the art will understand that the disclosure is not limited to a specific embodiment, and modifications, equivalents, and/or alternatives on the various embodiments described herein can be variously made without departing from the scope and spirit of the disclosure.

Figure 1:
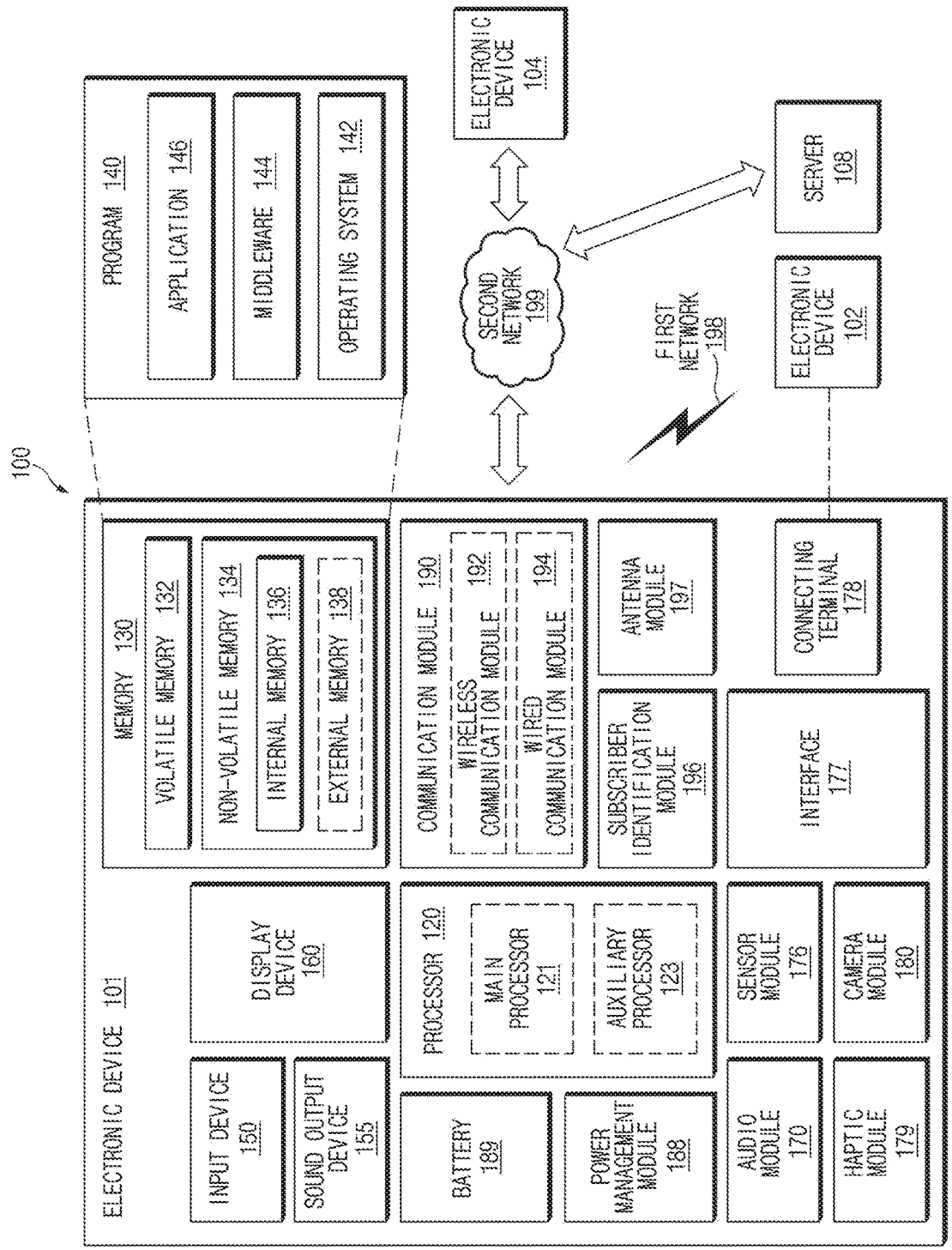
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
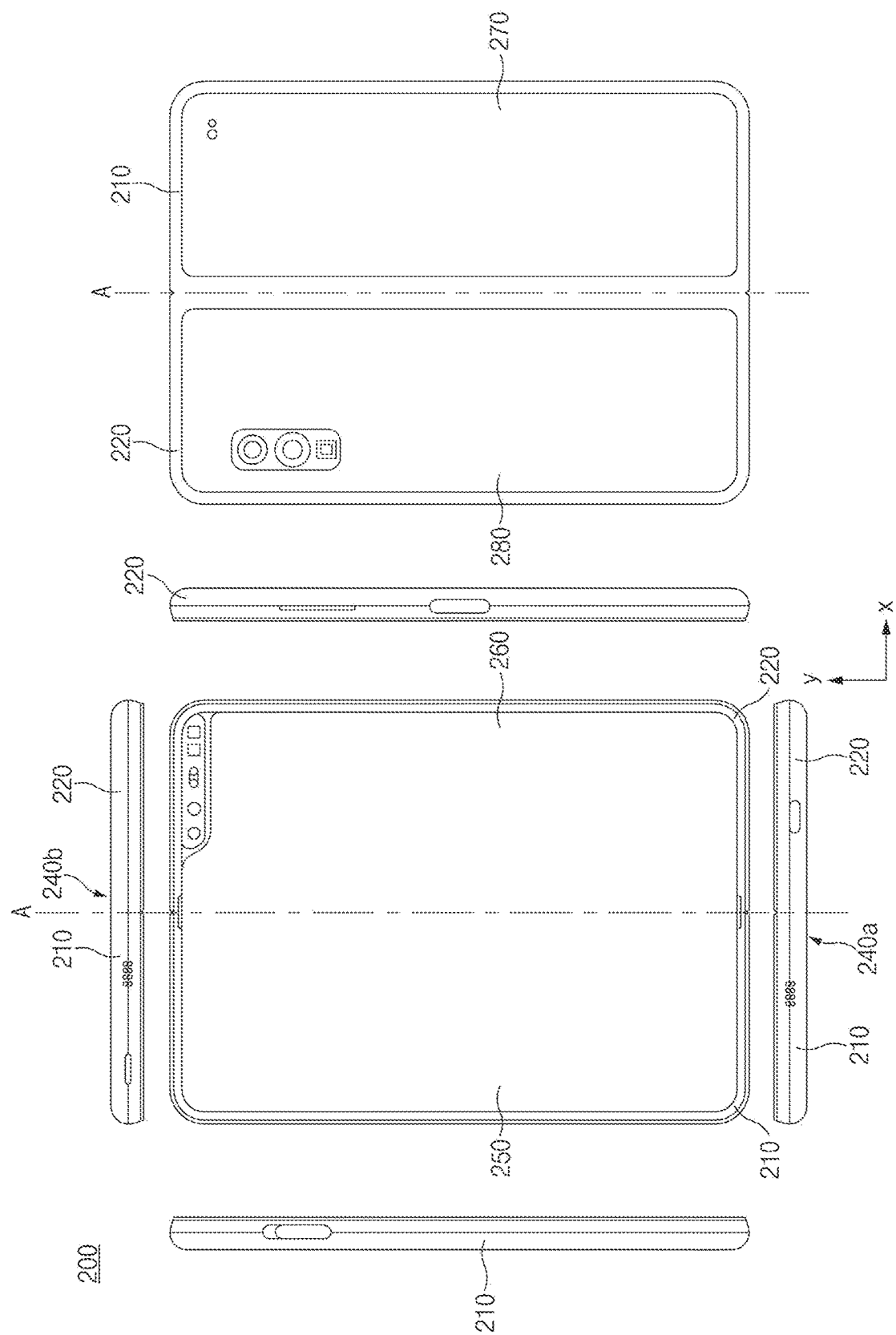
FIG. 2A is a view illustrating a foldable housing of an electronic device, which is in a flat state, according to an embodiment.
Figure 2B:
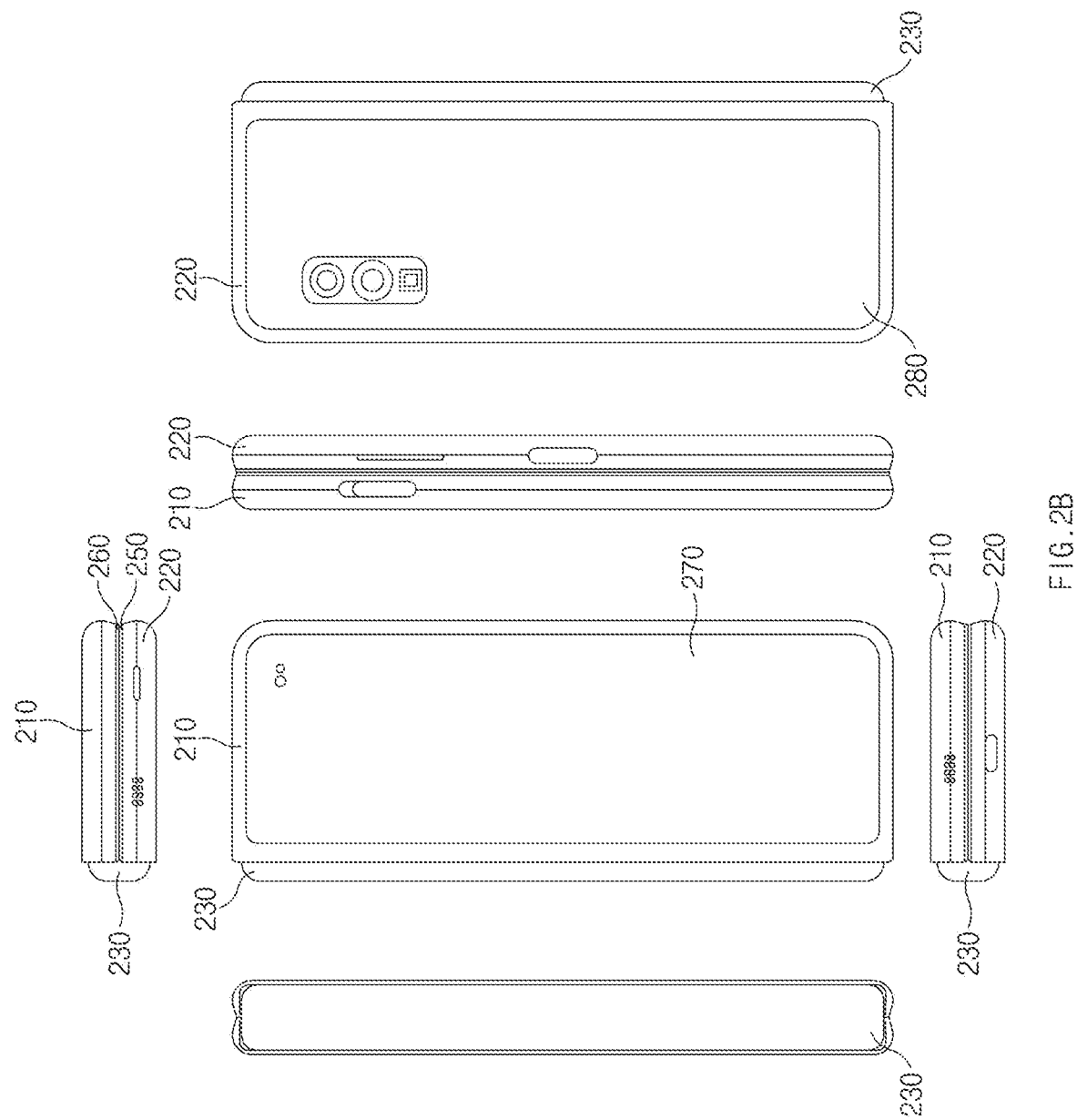
FIG. 2B is a view illustrating a foldable housing of an electronic device, which is in a folded state, according to an embodiment.

FIG. 2A is a view illustrating a foldable housing of an electronic device, which is in a flat state, according to an embodiment. FIG. 2B is a view illustrating a foldable housing of an electronic device, which is in a folded state, according to an embodiment.

In an embodiment, a foldable housing 200 may have a flat state or an unfolded state as illustrated in FIG. 2A, and may have a folded state and an intermediate state between the flat state and the folded state as illustrated in FIG. 2B. In the disclosure, unless otherwise specified, the "folded state" may refer to "fully folded state", and the "intermediate state" may refer to that the electronic device is folded with a certain angle.

Referring to FIGS. 2A and 2B, in an embodiment, the electronic device may include the foldable housing 200 and antenna radiators 240a and 240b. The foldable housing 200 may include a hinge structure 230, and a first housing structure 210 and a second housing structure 220 which are folded about the hinge structure 230.

The first housing structure 210, which is coupled to the hinge structure 230, may include a first surface 250 facing a first direction and a second surface 270 facing a second direction opposite to the first direction. The second housing structure 220, which is coupled to the hinge structure 230, may include a third surface 260 facing a third direction and a fourth surface 280 facing a fourth direction opposite to the third direction.

According to an embodiment, the electronic device may include a display (e.g., a flexible display or a foldable display). The display may be disposed on the first surface 250 of the first housing structure 210 and on the third surface 260 of the second housing structure 220.

In the illustrated embodiment, the first housing structure 210 and the second housing structure 220 may disposed at opposite sides about a folding axis (axis "A") and may have a symmetrical shape about the folding axis A. As described later, the first housing structure 210 and the second housing structure 220 may have various angles or various distances formed therebetween, depending on whether the folding state of the foldable housing 200 is the unfolded state, the folded state, or the intermediate state.

In an embodiment, when the folding state of the foldable housing 200 is the unfolded state (e.g., see FIG. 2A), the first housing structure 210 and the second housing structure 220 may have an angle of 180 degrees therebetween and may be arranged to face the same direction. In other words, the first direction in which the first surface 250 of the first housing structure 210 faces may be the same as the third direction in which the third surface 260 of the second housing structure 220 faces.

In an embodiment, when the foldable housing 200 is in the folded state (e.g., see FIG. 2B), the first housing structure 210 and the second housing structure 220 may be arranged to face each other. In other words, the first surface 250 of the first housing structure 210 may face the third surface 260 of the second housing structure 220.

In an embodiment, when the folding state of the foldable housing 200 is the intermediate state, the first housing structure 210 and the second housing structure 220 may be arranged with a certain angle. The first surface 250 of the first housing structure 210 and the third surface 260 of the second housing structure 220 may have an angle greater than an angle in the folded state and less than an angle in the unfolded state.

Referring to FIG. 2B, the hinge structure 230 is interposed between the first housing structure 210 and the second housing structure 220 to couple the first housing structure 210 to the second housing structure 220.

In an embodiment, the hinge structure 230 may be covered by a portion of the first housing structure 210 and the second housing structure 220 or be exposed to the outside, depending on the folding states of the foldable housing 200.

For example, when the foldable housing 200 is in the flat state as illustrated in FIG. 2A, the hinge structure 230 may be covered by the first housing structure 210 and the second housing structure 220 and not exposed to the outside. For example, when the foldable housing 200 is in the folded state (e.g., fully folded state) as illustrated in FIG. 2B, the hinge structure 230 may be exposed to the outside between the first housing structure 210 and the second housing structure 220. For example, when the first housing structure 210 and the second housing structure 220 are in the intermediate state that the first housing structure 210 and the second housing structure 220 are folded with a certain angle, a portion of the hinge structure 230 may be exposed to the outside between the first housing structure 210 and the second housing structure 220. However, in this embodiment, the exposed area of the hinge structure 230 may be smaller than the exposed area of the hinge structure 230 when the first housing structure 210 and the second housing structure 220 are in the fully folded state.

The antenna radiators 240a and 240b may be included at least one of the first housing structure 210 or the second housing structure 220. According to an embodiment, the antenna radiators 240a and 240b may be included in a portion of at least one of a side surface member disposed perpendicularly to the first surface 250 or the second surface 270 of the first housing structure 210 or a side surface member disposed perpendicularly to the third surface 260 or the fourth surface 280 of the second housing structure 220. The antenna radiators 240a and 240b may be formed of a conductive material such as metal.

The foldable housing 200 is not limited to the shapes illustrated in FIGS. 2A and 2B and the combination of the shapes and may be implemented in a different shape, through the combination of parts and/or the coupling of the parts.

Figure 3:
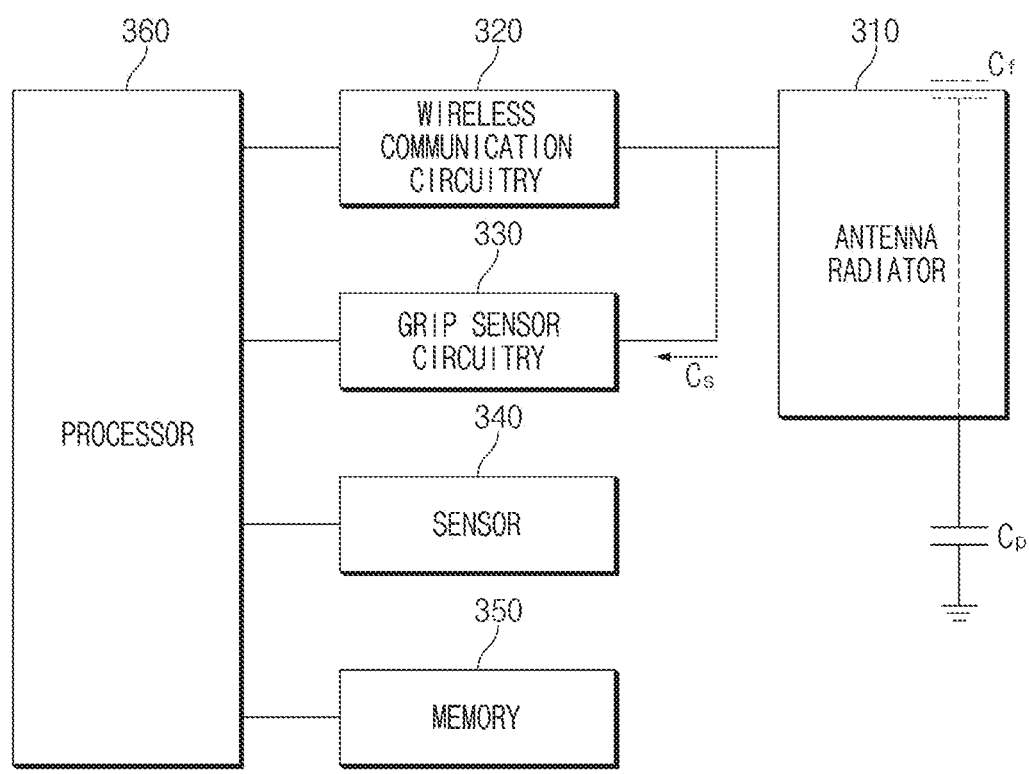
FIG. 3 is a block diagram illustrating an electronic device, according to an embodiment.

FIG. 3 is a block diagram illustrating an electronic device, according to an embodiment.

Referring to FIG. 3, an electronic device may include an antenna radiator 310, a wireless communication circuitry 320, a grip sensor circuitry 330, a sensor 340, a memory 350, and a processor 360.

The antenna radiator 310 may be implemented with a portion of the first housing structure 210 or the second housing structure 220. For example, the antenna radiator 310 may be implemented with a portion of a side surface member of the first housing structure 210 or the second housing structure 220. The antenna radiator 310 may radiate a communication signal under the control of the wireless communication circuitry 320. The antenna radiator 310 may be an antenna having a conductive pattern The antenna radiator 310 may be a radiator resonating at a predetermined frequency band and having a feeding part (not illustrated) and a grounding part (not illustrated). The antenna radiator 310 may be electrically connected with the wireless communication circuitry 320.

According to an embodiment, the antenna radiator 310 may be any one of a mobile communication antenna, a sub-communication antenna, a near field communication (NFC) antenna, a broadcasting communication antenna, a global positioning system (GPS) antenna, or a wireless charging antenna.

The wireless communication circuitry 320 may be disposed inside the first housing structure 210 or the second housing structure 220. The wireless communication circuitry 320 may make communication by transmitting/receiving a signal (e.g., communication signal) having a predetermined frequency band to/from an external device by using the antenna radiator 310.

The wireless communication circuitry 320 may control the intensity of a signal radiated through the antenna radiator 310 under the control of the processor 360.

The grip sensor circuitry 330 may be disposed inside the first housing structure 210 or the second housing structure 220. For example, the grip sensor circuitry 330 may be disposed adjacent to an outer surface of the first housing structure 210 or the second housing structure 220 to sense the grip of the user. In FIG. 3, signs "Cs", "Cf", and "Cp" do not actually indicate capacitors, but refer to virtual capacitances for the explanation of an operating principle of the grip sensor circuitry 330. The grip sensor circuitry 330 may be electrically connected with a conductive pad (not illustrated) and may be connected with the ground of a printed circuit board (PCB). The grip sensor circuitry 330 may measure the capacitance Cs corresponding to the sum of the capacitance Cp between the grip sensor circuitry 330 and the ground of the PCB, the capacitance of the antenna radiator 310, and the capacitance Cf between an external object and the conductive pad (not illustrated). When the external object (e.g., a human body or an object except the human body) approaches the antenna radiator 310, the capacitance Cs may be varied depending on the extent that the external object approaches the antenna radiator 310.

For example, the capacitance Cs may become the capacitance Cp between the grip sensor circuitry 330 and the ground of the PCB, before the external object approaches the antenna radiator 310. When the external object approaches the antenna radiator 310, the capacitance Cs becomes a value obtained by adding the capacitance Cf between the approaching external object and the conductive pad (not illustrated) to the capacitance Cp between the grip sensor circuitry 330 and the ground of the PCB.

The sensor 340 may be disposed inside the first housing structure 210 or the second housing structure 220.

For example, the sensor 340 may include at least one of a geomagnetic sensor, an acceleration sensor, a hall sensor or a magnetic sensor, a bending sensor, a temperature/humidity sensor, an infrared sensor, a gyroscope sensor, a position sensor (e.g., GPS), an air pressure sensor, a proximity sensor, or an RGB sensor (illuminance sensor).

According to an embodiment, the sensor 340 may sense the folding state of the foldable housing 200 For example, the sensor 340 may sense whether the foldable housing 200 is in the folded state, the flat state, and the intermediate state.

According to an embodiment, the intermediate state may include a plurality of states. For example, the angle formed between the first surface 250 of the first housing structure 210 and the third surface 260 of the second housing structure 220 may be in the range of 0 and 180 degrees. In an embodiment, the intermediate state is a state where the angle formed between the first surface 250 and the third surface 260 is in the range of 0 to 30 degrees, 30 to 60 degrees, 60 to 90 degrees, 90 to 120 degrees, 120 to 150 degrees, and 150 to 180 degrees. The sensor 340 may sense the type of the folding state of the foldable housing 200 of the plurality of states.

According to an embodiment, the sensor 340 may measure an angle between the first surface 250 of the first housing structure 210 and the third surface 260 of the second housing structure 220 in the foldable housing 200.

According to an embodiment, the sensor 340 may sense an unfolding motion or folding motion of the electronic device 101. According to an embodiment, the sensor 340) may detect a motion of the foldable housing 200 changed from the folded state to the unfolded state or changed from the unfolded state to the folded state. For example, when the sensor 340 is implemented with a gyro sensor, the sensor 340 measures an angle change resulting from a motion of the foldable housing 200 changed to the folded state or the unfolded state to detect the changed motion. For another example, the sensor 340 may sense the folding state or the unfolding state of the electronic device 101. In detail, the hall sensor 340 provided in the folded area measures a magnetic field to measure the distance between the first surface 250 of the first housing structure 210 and the third surface 260 of the second housing structure 220 in the foldable housing 200, thereby sensing whether the foldable housing 200 is in the folded state or the unfolded state.

In an embodiment, the sensor 340 may provide, to the processor 360, at least one of the folding state of the foldable housing 200, the angle between the first surface 250 of the first housing structure 210 and the third surface 260 of the second housing structure 220, or the motion state of the foldable housing 200.

The memory 350 may store a command, information, or data associated with the operations of components 310 to 340, and 360 included in the electronic device. For example, the memory 350 may store instructions that, when executed, cause the processor 360 to perform the various operations described in the disclosure.

The processor 360 may control the overall operation of the electronic devices according to various embodiments. The processor 360 may be disposed inside the first housing structure 210 or the second housing structure 220 and may be operatively coupled to the wireless communication circuitry 320, the sensor 340, and the grip sensor circuitry 330.

The processor 360 may sense the folding state of the foldable housing 200 using the sensor 340. The processor 360 may calculate a reference capacitance for measuring the variation in the capacitance measured through the grip sensor circuitry 330. The processor 360 may control the wireless communication circuitry 320 such that the intensity of a signal radiated through the antenna radiator 310 is restricted to be equal to or less than a value resulting from the folding state of the foldable housing 200. The processor 360 may release the restriction of the intensity of the signal radiated through the antenna radiator 310.

In the following description, it is assumed that the electronic device of FIG. 3 performs the process of FIG. 4. The operation described as being performed by the electronic device may be implemented by instructions that may be performed (or executed) by the processor 360 of the electronic device. The instructions may be stored, for example, in a computer recording medium or the memory 350 of the electronic device illustrated in FIG. 3.

Figure 4:
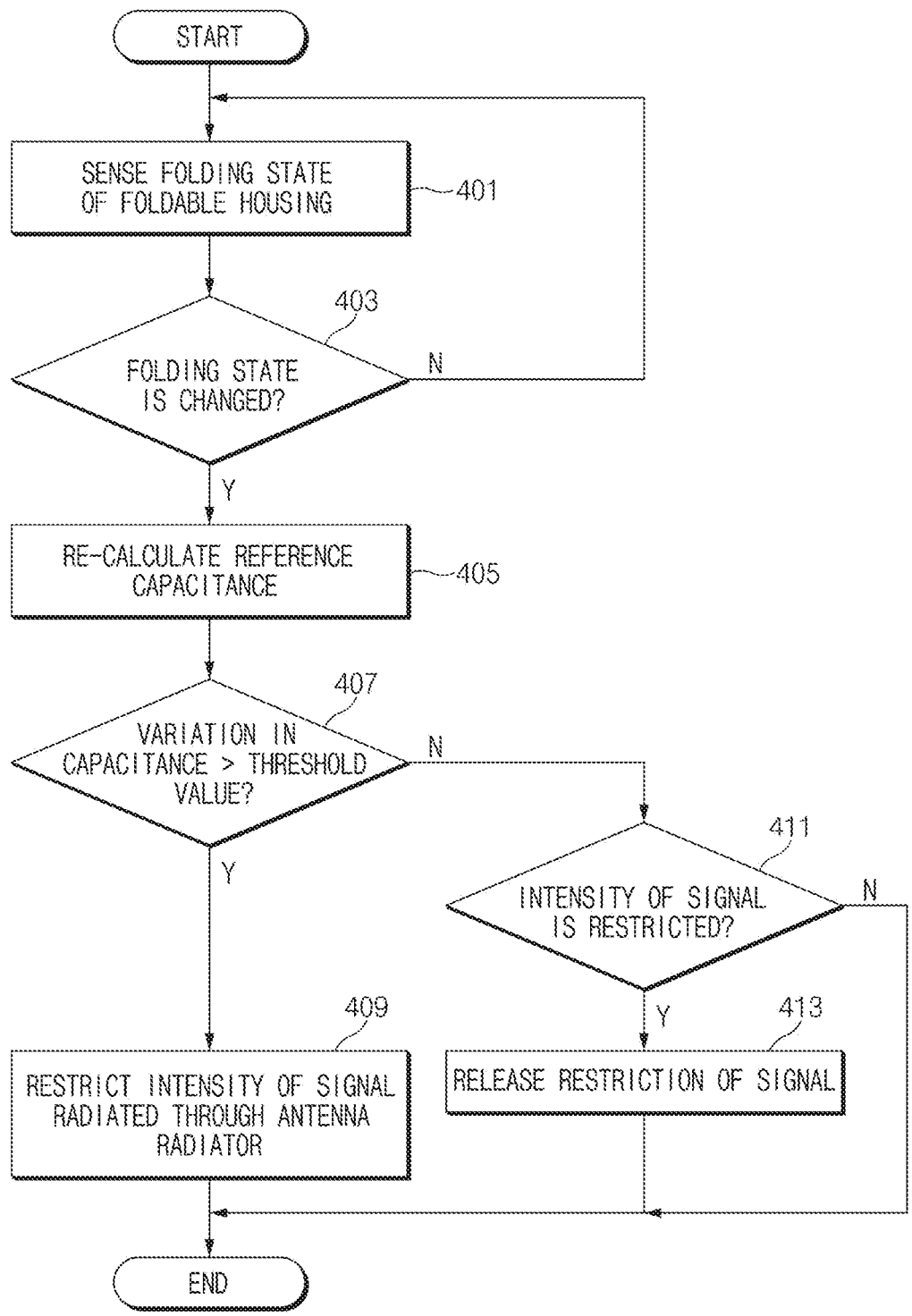
FIG. 4 is a flowchart illustrating a method for controlling the intensity of a radiated signal, according to an embodiment.

FIG. 4 is a flowchart illustrating a method for controlling the intensity of a signal radiated, according to an embodiment.

In operation 401, the processor 360 may sense the folding state of the foldable housing 200 by using the sensor 340.

The processor 360 may sense the type of the folding state of the foldable housing 200 by using the sensor 340.

According to an embodiment, the folding state may include a first state that the foldable housing 200 is folded and a second state that the foldable housing 200 is unfolded.

According to an embodiment, the folding state may further include at least one third state which is intermediate between the first state that the foldable housing 200 is folded and the second state that the foldable housing 200 is unfolded. In other words, the third state may be the intermediate state described above.

According to an embodiment, the folding state may include a plurality of third states. For example, the plurality of third states may include a state that the angle formed between the first surface 250 of the first housing structure 210 and the third surface 260 of the second housing structure 220 is in the range of 0 to 30 degrees, 30 to 60 degrees, 60 to 90 degrees, 90 to 120 degrees, 120 to 150 degrees, and 150 to 180 degrees.

When the folding state of the foldable housing 200 is changed (operation 403), the processor 360 may calculate a reference capacitance for measuring the variation in the capacitance measured through the grip sensor circuitry 330 in operation 405.

According to an embodiment, the reference capacitance may be an average value of capacitances measured through the grip sensor circuitry 330 for a preset time, after the folding state of the foldable housing 200 is changed.

In operation 407, the processor 360 may determine whether the variation in the capacitance, which is measured through the grip sensor circuitry 330, exceeds a specific threshold value.

According to an embodiment, the variation in the capacitance may be a value obtained by subtracting the reference capacitance from the capacitance measured through the grip sensor circuitry 330. In an embodiment, when an external object approaches the antenna radiator 310, the measured capacitance is increased and the variation in the capacitance is increased.

According to an embodiment, a preset threshold value may be varied depending on the folding state of the foldable housing 200. The threshold value when the folding state of the foldable housing 200 is sensed as the first state may be less than the threshold value when the folding state of the foldable housing 200 is sensed as the second state.

For example, when the foldable housing 200 is in the folded state and the distance between the external object and the antenna radiator 310 is 10 mm, the processor 360 may reduce the intensity of a signal radiated from the antenna radiator 310. When the foldable housing 200 is in the unfolded state and the distance between the external object and the antenna radiator 310 is 10 mm, the processor 360 may not reduce the intensity of the signal radiated through the antenna radiator 310.

When the variation in the capacitance measured through the grip sensor circuitry 330 exceeds a preset threshold value (operation 407), the processor 360 may control the wireless communication circuitry 320 to restrict the intensity of the signal radiated from the antenna radiator 310 to be equal to or less than a value resulting from the folding state of the foldable housing 200 in operation 409.

According to an embodiment, the value resulting from the first state may be greater than the value resulting from the second state. In other words, the intensity of the signal radiated from the antenna radiator 310 may have a greater value, when the variation in the capacitance of the foldable housing 200 in the folded state exceeds the threshold value, as compared to when the variation in the capacitance of the foldable housing 200 in the unfolded state exceeds the threshold value.

According to an embodiment, the value resulting from the third state may be less than the value resulting from the first state and may be greater than the value resulting from the second state.

In other words, the intensity of a signal radiated from the antenna radiator 310 when the foldable housing 200 is in the intermediate state and the variation in the capacitance exceeds the threshold value, may be less than the intensity of a signal radiated from the antenna radiator 310 when the foldable housing 200 is in the folded state and when the variation in the capacitance exceeds the threshold value, and may be greater than the intensity of a signal radiated from the antenna radiator 310 when the foldable housing 200 is in the unfolded state and when the variation in the capacitance exceeds the threshold value.

According to an embodiment, when a plurality of third states are included, a value from the plurality of third states may be reduced as the folding state approximates to the second state.

When the variation in the capacitance measured through the grip sensor circuitry 330 is less than or equal to a preset threshold value (operation 407), the processor 360 may control the wireless communication circuitry 320 to restrict the intensity of the signal radiated from the antenna radiator 310 to be equal to or less than a value resulting from the folding state of the foldable housing 200 in operation 411.

When the intensity of the signal radiated from the antenna radiator 310 is restricted to be equal to or less than the value resulting from the folding state of the foldable housing 200, the processor 360 may release the restriction of the intensity of the signal radiated from the antenna radiator 310 in operation 413.

The processor 360 may recover the intensity of the signal radiated from the antenna radiator 310.

The processor 360 may calculate a reference capacitance when the folding state of the foldable housing 200 is changed (operation 403) and when the wireless communication circuitry 320 is controlled to restrict the intensity of the signal radiated from the antenna radiator 310 to be equal to or less than the value resulting from the folding state of the foldable housing 200 (operation 411). When the variation in the capacitance measured through the grip sensor circuitry 330 does not exceed the preset threshold value (operation 407), the processor 360 may release the restriction.

Figure 5:
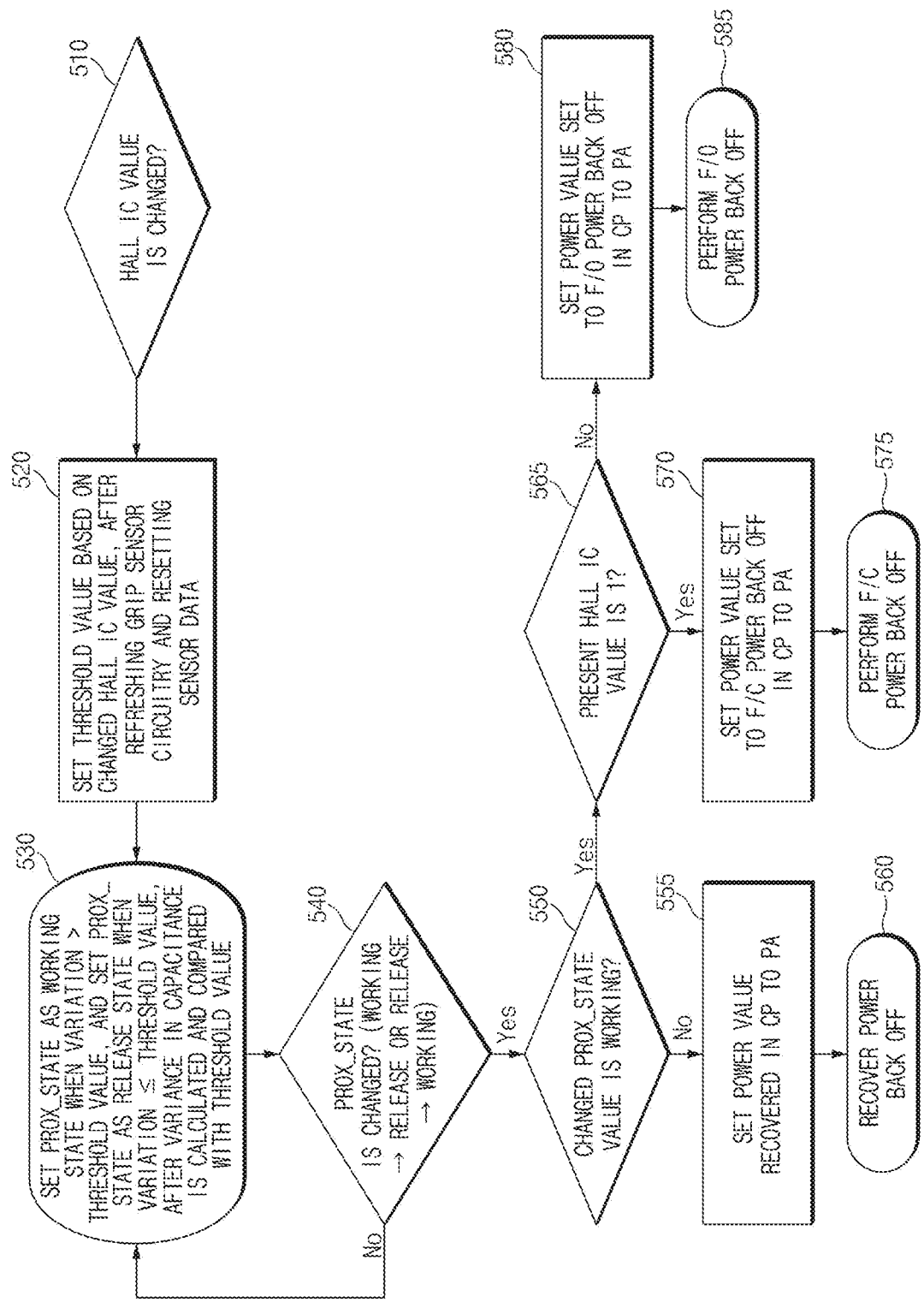
FIG. 5 is a flowchart illustrating a method for controlling the intensity of a radiated signal through various manners by an electronic device, according to an embodiment.

FIG. 5 is a flowchart illustrating a method for controlling the intensity of a radiated signal through various manners by an electronic device 101, according to an embodiment.

According to an embodiment, the electronic device 101 may determine whether the value of a hall integrated circuit (hall IC) is changed in operation 510. The hall IC value may be a digital value indicating the folding state of the foldable housing 200. The hall IC value may be calculated based on a measurement result of the sensor 340 implemented with a hall sensor.

According to an embodiment, the hall IC value may have a value of '0' or '1'. For example, when the foldable housing 200 is in the unfolded state, the hall IC value may be '0'. For example, when the foldable housing 200 is in the folded state, the hall IC value may be '1'. When the hall IC value is changed from '0' to '1' or from '1' to '0', the electronic device 101 may determine the folding state of the electronic device as being changed.

According to an embodiment, the electronic device 101 may refresh the grip sensor circuitry 330 and reset sensor data of the sensor 340 in operation 520. When the folding state of the foldable housing 200 is changed, the capacitance measured by the grip sensor circuitry 330 is changed. Accordingly, the value measured before the folding state is changed may be removed. For example, when the folding state is changed, the electronic device 101 may re-calculate a proximity offset value of the grip sensor circuitry 330. For another example, when the folding state is changed, the electronic device 101 may a measured proximity average value.

In an embodiment, the electronic device 101 may set a threshold value based on the changed hall IC value in operation 520. The threshold value may be a value for changing the capacitance as much as possible in each folding state of the foldable housing 200.

According to an embodiment, the electronic device 101 may calculate the variation in the capacitance measured by the grip sensor circuitry 330 and compare the variation with the threshold value in operation 530. The variation in the capacitance, which is measured by the grip sensor circuitry 330, may be a difference value between an effective capacitance and an average capacitance.

According to an embodiment, the electronic device 101 may set a proximity state to a working state when the variation in the capacitance measured by the grip sensor circuitry 330 is greater than the threshold value in operation 530, and may set the proximity state to a release state when the variation in the capacitance is less than or equal to the threshold value.

According to an embodiment, the electronic device 101 may determine whether the proximity state is changed in operation 540. When the proximity state is changed, the electronic device 101 may proceed to operation 550. When the proximity state is not changed, the electronic device 101 may return to operation 530.

According to an embodiment, the electronic device 101 may determine whether the changed proximity state is the working state in operation 550. When that the variation in the capacitance is changed to a value in the working state, which is greater than the threshold value, the electronic device 101 may proceed to operation 565. When the variation in the capacitance is not changed to a value in the working state, the electronic device 101 may proceed to operation 555.

According to an embodiment, the electronic device 101 may set the communication processor (e.g., the auxiliary processor 123 of FIG. 1) to output a power value, which is recovered from the communication processor, through a power amplifier (PA), in operation 555.

According to an embodiment, the electronic device 101 may control the output power to return to a normal state, in operation 560. For example, the electronic device 101 may recover the output power by performing "power back off". Accordingly, when the variation in the capacitance is less than or equal to the threshold value, the electronic device 101 may maintain the normal output.

According to an embodiment, the electronic device 101 may determine whether a present hall IC value is 1 in operation 565. The electronic device 101 may proceed to operation 570 when the present hall IC value is '1'. The electronic device may proceed to operation 580 when the present hall IC value is not '1'.

According to an embodiment, the electronic device 101 may set the communication processor to output, through the PA, a power value, which is set to "power back off" in the communication processor. The "power back off" is set in the state that the foldable housing 200 is in a folder close (F/C) state or the folded state, in operation 570.

According to an embodiment, the electronic device 101 may perform power back off in the F/C state in operation 575. The electronic device may restrict the maximum intensity of the signal radiated from the electronic device to a value corresponding to the threshold value set in the F/C state.

According to an embodiment, the electronic device 101 may set the communication processor to output, through the PA, a power value set to "power back off", in the state that the foldable housing 200 is in a folder open (F/O) state, which is the unfolded state, in operation 580.

According to an embodiment, the electronic device 101 may perform power back off in the F/O state in operation 585. The electronic device 101 may restrict the maximum intensity of the signal radiated from the electronic device to a value corresponding to the threshold value set in the F/O state.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A. B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As described above, according to an embodiment of the disclosure, when the intensity of the signal radiated from the antenna radiator is controlled by the grip sensor, and when the foldable housing is folded, the malfunction may be prevented and the threshold value and the control power value may be set to different values depending on when the foldable housing is closed or open.

Besides, a variety of effects directly or indirectly understood through the present disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a foldable housing including:
   a hinge structure;
   a first housing structure coupled to the hinge structure and including a first surface facing a first direction and a second surface facing a second direction opposite to the first direction;
   a second housing structure coupled to the hinge structure, including a third surface facing a third direction and a fourth surface facing a fourth direction opposite to the third direction, and foldable with respect to the first housing structure about the hinge structure, wherein the first surface faces the third surface when the foldable housing is folded and the first direction is the same as the third direction when the foldable housing is unfolded;
   a wireless communication circuitry disposed inside the first housing structure or the second housing structure;
   an antenna radiator disposed inside the first housing structure or the second housing structure or exposed through at least one surface of the first housing structure or the second housing structure and electrically connected with the wireless communication circuitry;
   a sensor disposed inside the first housing structure or the second housing structure and configured to sense a folding state of the foldable housing;
   a grip sensor circuitry disposed inside the first housing structure or the second housing structure or exposed through at least one surface of the first housing structure or the second housing structure;
   a processor disposed inside the first housing structure or the second housing structure and operatively connected with the wireless communication circuitry, the sensor, and the grip sensor circuitry; and
   a memory operatively connected with the processor and storing instructions that, when executed by the processor, cause the processor to:
   sense the folding state of the foldable housing by using the sensor;
   calculate a reference capacitance for measuring a variation in a capacitance measured through the grip sensor circuitry based on the folding state of the foldable housing being changed; and
   control the wireless communication circuitry to restrict an intensity of a signal radiated from the antenna radiator to be equal to or less than a value resulting from the folding state of the foldable housing based on the variation in the capacitance measured through the grip sensor circuitry exceeding a preset threshold value,
   wherein the reference capacitance is an average value of capacitances measured through the grip sensor circuitry for a preset time after the folding state of the foldable housing is changed.

2. The electronic device of claim 1, wherein the folding state includes a first state that the foldable housing is folded and a second state that the foldable housing is unfolded.

3. The electronic device of claim 2, wherein a value resulting from the first state is greater than a value resulting from the second state.

4. The electronic device of claim 2, wherein:
   the folding state includes a third state between the first state that the foldable housing is folded and the second state that the foldable housing is unfolded, and
   a value resulting from the third state is less than the value resulting from the first state and greater than the value resulting from the second state.

5. The electronic device of claim 4, wherein:
   the folding state includes a plurality of third states, and
   a value resulting from the plurality of third states is reduced as the folding state approximates to the second state.

6. The electronic device of claim 1, wherein:
   the folding state includes a first state that the foldable housing is folded and a second state that the foldable housing is unfolded;
   the preset threshold value is varied depending on the folding state of the foldable housing; and
   a threshold value resulting from the first state is less than a threshold value resulting from the second state.

7. The electronic device of claim 1, wherein the variation in the capacitance is a value obtained by subtracting the reference capacitance from the capacitance measured through the grip sensor circuitry.

8. The electronic device of claim 1, wherein the memory stores instructions that, when executed by the processor, cause the processor to:
   calculate the reference capacitance based on (i) the folding state of the foldable housing being changed and (ii) the wireless communication circuitry being controlled to restrict the intensity of the signal radiated from the antenna radiator to be equal to or less than the value resulting from the folding state of the foldable housing; and
   release the restriction based on the variation in the capacitance measured through the grip sensor circuitry not exceeding the preset threshold value.

9. An electronic device comprising:
   a foldable housing including:
   a hinge structure;
   a first housing structure coupled to the hinge structure and including a first surface facing a first direction and a second surface facing a second direction opposite to the first direction;
   a second housing structure coupled to the hinge structure, including a third surface facing a third direction and a fourth surface facing a fourth direction opposite to the third direction, and foldable with respect to the first housing structure about the hinge structure, wherein the first surface faces the third surface when the foldable housing is folded and the first direction is the same as the third direction when the foldable housing is unfolded;
   a wireless communication circuitry disposed inside the first housing structure or the second housing structure;
   a sensor disposed inside the first housing structure or the second housing structure and configured to sense a folding state of the foldable housing, the folding state including a folded state and an unfolded state;
a grip sensor circuitry disposed outside the first housing structure or the second housing structure;
a processor disposed inside the first housing structure or the second housing structure and operatively connected with the wireless communication circuitry, the sensor, and the grip sensor circuitry; and
a memory operatively connected with the processor and storing instructions that, when executed by the processor, cause the processor to control the grip sensor circuit based at least on sensor data obtained from the sensor,
wherein the memory stores instructions that, when executed by the processor, cause the processor to calculate a reference capacitance for measuring a variation in a capacitance measured through the grip sensor circuitry based on the folding state of the foldable housing being changed, and
wherein the reference capacitance is an average value of capacitances measured through the grip sensor circuitry for a preset time after the folding state of the foldable housing is changed.

10. The electronic device of claim 9, wherein the memory stores instructions that, when executed by the processor, cause the processor to:
control the grip sensor circuitry based on at least one of a variation in a capacitance measured through the grip sensor circuitry or changing a preset threshold value.

11. The electronic device of claim 9, wherein the memory stores instructions that, when executed by the processor, cause the processor to:
control the wireless communication circuitry to control an intensity of a signal, that is radiated, based on the sensor data of the sensor and the folding state of the foldable housing, when a variation in a capacitance of the grip sensor circuitry is greater than a preset threshold value.

12. The electronic device of claim 9, wherein the memory stores instructions that, when executed by the processor, cause the processor to:
reset the sensor data from the sensor as an angle of the foldable housing is varied in an intermediate state between the folded state and the unfolded state.

13. The electronic device of claim 9, wherein a preset threshold value is less when the foldable housing is in the folded state than when the foldable housing is in the unfolded state.

14. A non-transitory computer-readable storage medium to store instructions that, when executed by a processor of an electronic device including a foldable housing, cause the processor to:
sense a folding state of the foldable housing;
calculate a reference capacitance for measuring a variation in a capacitance measured through a grip sensor circuitry based on the folding state of the foldable housing being changed; and
restrict an intensity of a signal radiated from an antenna radiator to be equal to or less than a value resulting from the folding state of the foldable housing based on the variation in the capacitance measured through the grip sensor circuitry exceeding a preset threshold value,
wherein the reference capacitance is an average value of capacitances measured through the grip sensor circuitry for a preset time after the folding state of the foldable housing is changed.

15. The non-transitory computer-readable storage medium of claim 14, wherein the folding state includes:
a first state that the foldable housing is folded and a second state that the foldable housing is unfolded.

16. The non-transitory computer-readable storage medium of claim 14, wherein:
the folding state includes a first state that the foldable housing is folded and a second state that the foldable housing is unfolded,
the preset threshold value is varied depending on the folding state of the foldable housing, and
a threshold value resulting from the first state is less than a threshold value resulting from the second state.

17. The non-transitory computer-readable storage medium of claim 14, wherein the instructions, when executed by the processor, cause the processor to:
calculate the reference capacitance based on (i) the folding state of the foldable housing being changed and (ii) wireless communication circuitry being controlled to restrict an intensity of a signal radiated from the antenna radiator to be equal to or less than the value resulting from the folding state of the foldable housing; and
release the restriction based on the variation in the capacitance measured through the grip sensor circuitry not exceeding the preset threshold value.

* * * * *